T. N. RUSSELL.
BRAKE STEP.
APPLICATION FILED JULY 20, 1912.
1,160,090.
Patented Nov. 9, 1915.
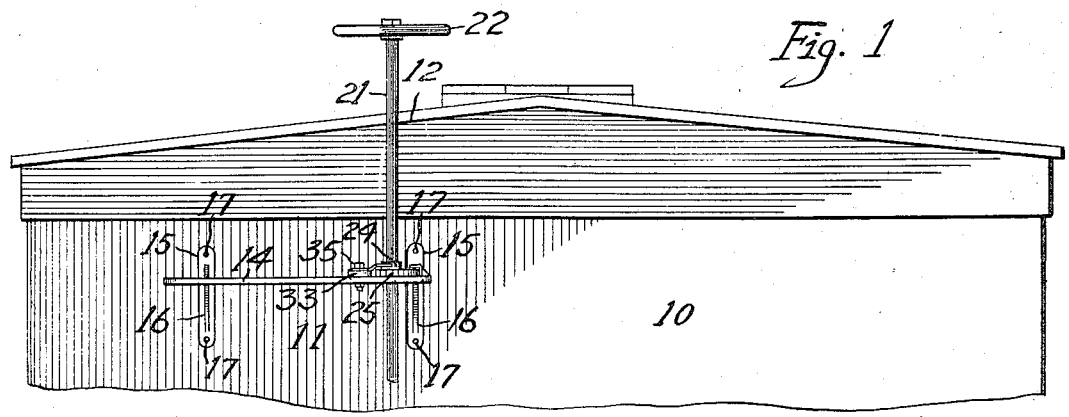
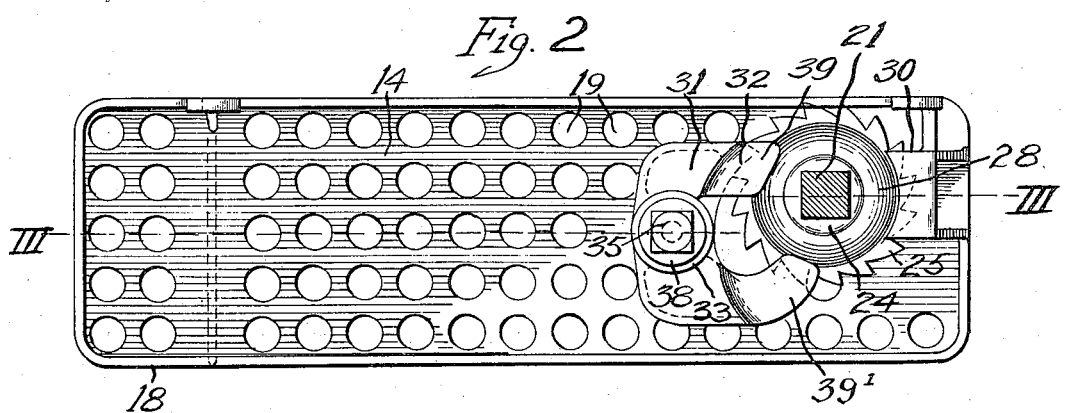
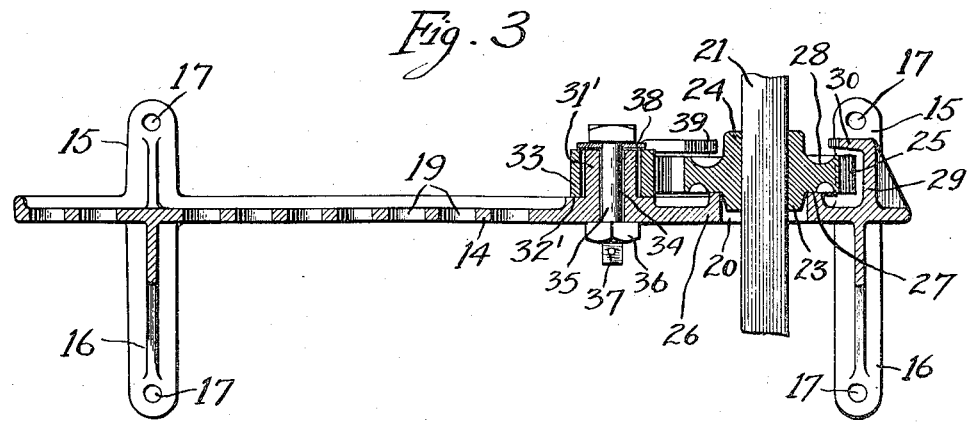
WITNESSES:
J. M. Baker.
Martha Westman
INVENTOR
Thomas N. Russell
BY
Pane Carpenter
ATTORNEY

UNITED STATES PATENT OFFICE.

THOMAS NATHAN RUSSELL, OF CHICAGO, ILLINOIS, ASSIGNOR TO HARRY VISSERING & COMPANY, OF LOUISVILLE, KENTUCKY, A CORPORATION OF KENTUCKY.

BRAKE-STEP.

1,160,090.  Specification of Letters Patent.  Patented Nov. 9, 1915.

Application filed July 20, 1912. Serial No. 710,726.

*To all whom it may concern:*

Be it known that I, THOMAS N. RUSSELL, a citizen of the United States, and a resident of Chicago, in the county of Cook and State of Illinois, have invented certain new and useful Improvements in Brake-Steps, of which the following is a specification.

My present invention relates to brake steps in general, and more particularly to the steps or plates commonly used for supporting the brake staff, the ratchet wheel and the dog generally employed in connection therewith in railway hand brake practice, and has special reference to the provision of an improved form of construction wherein several parts heretofore made separately and thereafter assembled, may be made simultaneously thereby avoiding not only the cost of assembling, but also the dangers and expenses ensuant upon relative displacements of the parts when formed separately and thereafter assembled.

The principal objects of my present invention are the provision of an improved brake step having integral supporting brackets, and one having no tendency either to split or to become separated from the brackets; the provision of an improved device of the character referred to having means whereby rain or melting water of snow or ice may be discharged therefrom; the provision of an improved form of device giving better grip for the feet of the trainman when using it in taking up the hand brakes; the provision of an improved form of step provided with integral means whereby the pawl or dog acting on the ratchet wheel of the brake staff may be so held in place as to prevent such dog from slipping away from the ratchet wheel when the brakes are wound and the pawl is adjusted in position against the strain of the brakes; the provision of a step having improved integral means for holding the dog and brake staff in predetermined position; the provision of a step having an improved pawl provided with a portion extending over the top of the ratchet wheel whereby the ratchet wheel is prevented from becoming displaced from position relatively to the step or relatively to the pawl; the provision of a step having improved means whereby the relatively large surface of the ratchet wheel may take up wear instead of such wear being taken up by the brake staff; the provision of an improved brake step having integral means for receiving and retaining the ratchet wheel and hence the staff in position, and in combination with such means improved means for receiving and retaining the pawl in position, together with such further objects as may hereinafter appear.

In overcoming the objections referred to as well as others which are known to those who are skilled in railway practice, in attaining the stated objects, and in gaining certain additional advantages which will be below disclosed, I provide a construction, a preferred embodiment of which is illustrated in the accompanying drawing, wherein—

Figure 1 is an elevational view of an end of an ordinary type of railroad box car having my improved step applied thereto; Fig. 2 is a plan view of the step appearing in Fig. 1; Fig. 3 is a longitudinal sectional view, taken on the line III—III of Fig. 2.

Referring first to Fig. 1, it will be observed that I have here shown my improvements embodied integrally in a brake step applied at the customary position indicated at 11 adjacent the roof 12 of the box car 10. The body 14 of the step is provided adjacent each end with supporting brackets 15—15, 16—16, which are preferably made integral therewith, as may readily be done when, as is my preferred practice, I form the body 14 of cast malleable iron, the said brackets 15 and 16 being conveniently apertured as at 17—17 for the passage of bolts or lag screws whereby the step may be attached through the car siding to the frame members of the body thereof.

Referring now more particularly to Figs. 2 and 3 it will be observed that in order to give a firm grip for the shoes of the user I form on the body 14 an upturned peripheral flange 18 and in further aid of this object and in order to drain off rain water or water of melting, I form in such body 14 a number of openings 19. As is perhaps best to be seen in Fig. 3, the body 14 is provided with an aperture 20 large enough to allow the passage therethrough of the brake staff 21 commonly operable by the hand wheel 22, and also preferably of sufficient size to accommodate and form a bearing for the hub 23 of the wheel 24 which is provided with peripheral teeth 25 (see Fig. 2) preferably of ratchet form. Adjacent the margins of the aperture 20 I provide an upturned peripheral flange 26 which is desirably faced off as indicated at 27 in order to form a bearing for a portion of the hub 23 or an extension of the web 28 of the wheel 24. For holding the ratchet wheel 24 and hence the brake in position when wound, I employ as a detent a swinging pawl or dog 31 having a tooth 32 adapted for engagement with the teeth 25 of such wheel 24. For sustaining the dog in position and preventing lateral movement thereof relatively to the wheel 24, I form on the body 14 of the step a boss 31' having a portion indicated at 32' respectively faced off to provide a bearing for the hub 33 on which the dog swings. The boss 31' is preferably apertured as indicated at 34 for the passage of a bolt 35 threaded and apertured for a nut 36 and a cotter pin 37 and a washer 38 bearing on the hub 33 is employed for preventing the dog 31 from rising relatively to the body 14 or bearing 32. For the prevention of any rising, canting or other displacement of the wheel 24 relatively to the body 14 or relatively to the dog 31, I form on the dog 31 a projection extending over the top of the wheel 24, the projection being preferably in the form of a pair of toes 39, 39' one of which will at all times extend over the top of the wheel 24. In further aid of the object of maintaining the wheel 24 in position when it has been slipped into place and the brake staff put through the wheel into operative position, and more particularly for coöperating to such effect with flanged portions of the detent 31 just above described, I form on the body 14, an upwardly extending portion 29 having a part 30 projecting over the top of the wheel 24.

I am aware that it has heretofore been proposed to apply to a wooden brake step applied to a car body in the customary manner, a bearing and spacing plate which is apertured for the passage of a brake staff carrying a ratchet wheel, and which has formed thereupon a bearing portion to receive the ratchet wheel, a trunnion forming a pivot or fulcrum for the locking pawl and a guard coöperative with the ratchet wheel to retain the same in relation to the bracket.

From the foregoing description of my present invention, however, it will be apparent not only that the ratchet wheel, pawl, and staff are firmly held in predetermined spaced operative relation to each other, but also that they are permanently fixed in predetermined relation to the step, and that not only is there no possibility that the toothed portion of the pawl may in its passage between the center upon which the pawl swings and the center of the ratchet wheel swing sufficiently far away from the last named center to allow it to fail to engage the teeth of the wheel 24 and thereby fail to hold the brake staff against the winding strain, and likewise that it is impossible for either the pawl or the ratchet either to tilt or to rise vertically out of the plane where engagement at the proper time is assured.

It will further be noted that the hub of the ratchet wheel sustains the wear and tear of service, instead of such being borne by the brake staff with consequent wearing of such staff through contact with the margins of the aperture as is commonly the case, and that as the boss is formed integrally with the step, all winding strain is taken by the boss and thence directly by the step instead of by the pawl, or intermediately by a plate.

Other advantages of the present invention will be readily apparent to those accustomed to the construction and use of devices in this art.

Having thus described my invention and illustrated its use, what I claim as new and desire to secure by Letters Patent is:

1. In combination with a car body and brake staff having a toothed wheel and a detent therefor, an all metallic brake step having integral means for attaching it to the car end below the level of the roof, and a shelf portion adapted to act as a rest for the whole foot and apertured for the reception of the staff and provided with a bearing for the hub of the wheel, and with an integral boss for sustaining the detent and preventing lateral movement thereof relatively to the step and thence to the body.

2. In combination with a car body and a brake staff having a toothed wheel and a detent therefor, an all metallic brake step having integral means for attaching it to the car end below the level of the roof, and a shelf portion adapted to act as a rest for the whole foot and apertured for the reception of the staff and provided with an integral bearing for the hub of the wheel, and with means for sustaining the detent and preventing lateral movement thereof relatively to the step and thence to the body.

3. In combination with a car body and a brake staff having a toothed wheel and a detent therefor, an all metallic brake step having integral means for attaching it to the car end below the level of the roof, and a shelf portion adapted to act as a rest for the whole foot and apertured for the reception of the staff and provided with integral means for receiving the wheel and with integral means for sustaining the detent and preventing lateral movement thereof relatively to the step and thence to the body.

4. In combination with a car body and a brake staff having a toothed wheel and a detent therefor, an all metallic brake step having integral means for attaching it to the car end below the level of the roof, and a shelf portion adapted to act as a rest for the whole foot and apertured for the reception of the staff and provided with a socket forming a bearing for the reception of the hub of the wheel and with integral means for sustaining the detent and preventing lateral movement thereof relatively to the step and thence to the body.

5. In combination with a car body and brake staff having a toothed wheel and a detent therefor, an all metallic brake step having integral means for attaching it to the car end below the level of the roof, and a shelf portion adapted to act as a rest for the whole foot and apertured for the reception of the staff and provided with a socket for the reception of the wheel and with an integral boss for sustaining the detent.

6. In combination with a car body and a brake staff having a toothed wheel and a detent therefor, an all metallic brake step having integral means for attaching it to the car end below the level of the roof, and a shelf portion adapted to act as a rest for the whole foot and apertured for the reception of the staff and provided with means for the reception of the wheel and with means for sustaining the detent, said step body being provided with an integral extension over the top of said wheel, whereby the wheel is restrained from rising from the bearing.

7. As a new article of manufacture a unitary cast metal brake step provided with an integral supporting bracket, rearwardly arranged thereon for attaching the step to the car end below the level of the roof, the body of said step being provided with a socket for receiving a toothed wheel and with an integral extension for restraining the wheel from rising.

8. As a new article of manufacture a unitary cast metal brake step provided with an integral supporting bracket rearwardly arranged thereon for attaching the step to the car end below the level of the roof, the body of the step being provided with a socket for receiving a toothed wheel and with an integral boss for sustaining a detent in operative relation to the wheel.

9. As a new article of manufacture a unitary cast metal brake step provided with an integral supporting bracket rearwardly arranged thereon for attaching the step to the car end below the level of the roof, the body of the step being provided with a socket for receiving a toothed wheel, with an integral boss for sustaining a detent in operative relation to the wheel and with an integral extension for preventing the wheel from rising from said socket.

10. In combination with a body and a brake staff having a toothed wheel and a detent therefor, an all metallic brake step having integral means for attaching it to the car end below the level of the roof, and a shelf portion adapted to act as a rest for the whole foot apertures for the reception of the staff and provided with a bearing for the hub of the wheel, and with integral means forming a bearing for sustaining the detent and preventing lateral movement thereof, and thereby the staff is prevented from displacement relatively to the car.

In testimony whereof I have hereunto signed my name in the presence of the two subscribed witnesses.

THOMAS NATHAN RUSSELL.

Witnesses:
MARTHA WESTMAN,
PAUL CARPENTER.